United States Patent
Senda et al.

(10) Patent No.: US 9,508,025 B2
(45) Date of Patent: Nov. 29, 2016

(54) IMAGE PROCESSING DEVICE, IMAGE PROCESSING METHOD AND MEDIUM

(71) Applicant: NEC Corporation, Minato-ku, Tokyo (JP)

(72) Inventors: Shuji Senda, Tokyo (JP); Takashi Shibata, Tokyo (JP); Akihiko Iketani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/440,382

(22) PCT Filed: Nov. 5, 2013

(86) PCT No.: PCT/JP2013/006519
§ 371 (c)(1),
(2) Date: May 4, 2015

(87) PCT Pub. No.: WO2014/073198
PCT Pub. Date: May 15, 2014

(65) Prior Publication Data
US 2015/0302273 A1    Oct. 22, 2015

(30) Foreign Application Priority Data
Nov. 6, 2012   (JP) ................. 2012-244187

(51) Int. Cl.
G06K 9/62 (2006.01)
G06T 3/40 (2006.01)
G06T 5/00 (2006.01)

(52) U.S. Cl.
CPC ............ G06K 9/627 (2013.01); G06T 3/4053 (2013.01); G06T 5/003 (2013.01)

(58) Field of Classification Search
None
See application file for complete search history.

(56) References Cited

U.S. PATENT DOCUMENTS

| | | | |
|---|---|---|---|
| 2009/0116732 A1* | 5/2009 | Zhou | H04N 13/0029 382/154 |
| 2011/0206296 A1* | 8/2011 | Sakaguchi | G06T 3/4053 382/299 |

FOREIGN PATENT DOCUMENTS

| | | |
|---|---|---|
| JP | 2009181508 A | 8/2009 |
| JP | 2010273328 A | 12/2010 |
| JP | 2011081476 A | 4/2011 |

(Continued)

OTHER PUBLICATIONS

International Search Report for PCT Application No. PCT/JP2013/006519, mailed on Dec. 3, 2013.

(Continued)

Primary Examiner — Sumati Lefkowitz
Assistant Examiner — David Perlman

(57) ABSTRACT

An image processing device according to the present invention includes: a patch generation unit which generates an input patch used for comparison on the basis of an input image; a modification parameter estimation unit which estimates a parameter used in blurred modification on the basis of the input image; a blurred image generation unit which generates a blurred image on the basis of a learning image by using the parameter; a patch pair generation unit which generates a patch pair used to compose a restoration image on the basis of the blurred image and the learning image; a selection unit which selects a patch pair used to compose the restoration image on the basis of the input patch; and a composition unit which composes the restoration image on the basis of the patch pair selected by the selection unit.

13 Claims, 11 Drawing Sheets

(56) References Cited

FOREIGN PATENT DOCUMENTS

JP        2011170456 A      9/2011
JP        2011188478 A      9/2011

OTHER PUBLICATIONS

English Translation of written opinion for PCT Application No. PCT/JP2013/006519.
Jianping Qiao et al., "A NoveL SVM-Based Blind Super-Resolution Algorithm", International Joint Conference on Neural Networks, 2006. IJCNN '06, Piscataway, NJ, IEEE Operations Center, Jul. 16, 2006, pp. 2523-2528, XP010948819, DOI: 10.1109/IJCNN.2006. 1716434.
Liu Gang et al., "MAP Based Blind Super-Resolution", Industrial Control and Electronics Engineering (ICICEE), 2012 International Conference on IEEE, Aug. 23, 2012, pp. 26-28, XP032262169, DOI: 10.1109/ICICEE.2012.15.
Takashi Shibata et al., "Single Image Super Resolution Reconstruction in Perturbed Exemplar Sub-space", Nov. 5, 2012, Computer Vision ACCV 2012, Springer Berlin Heidelberg, pp. 401-412, XP047027082.
Extended European Search Report for EP Application No. EP13853707.1 dated May 19, 2016.

\* cited by examiner

IMAGE PROCESSING DEVICE, IMAGE PROCESSING METHOD AND MEDIUM

This application is a National Stage Entry of PCT/JP2013/006519 filed on Nov. 5, 2013, which claims priority from Japanese Patent Application 2012-244187 filed on Nov. 6, 2012, the contents of all of which are incorporated herein by reference, in their entirety.

TECHNICAL FIELD

The present invention relates to image processing, and more particularly, relates to an image processing device and an image processing method for increasing the resolution of an image.

BACKGROUND ART

As digital image data are widely used, techniques for processing image data are widely used.

For example, an image processing device using image data changes the resolution of image data as necessary (for example, see PTL 1).

On the other hand, a remote monitoring system using multiple image-capturing devices and an image processing device processing images is widely employed.

There is a case in which image data captured with the remote monitoring system described above has a resolution lower than a required resolution by performance of the image-capturing device or external factors.

A super resolution technique is one of techniques for processing the resolution of such image data, and more particularly, the super resolution technique is a technique for enhancing the resolution of the image data.

The super resolution technique includes the following techniques.

The first super resolution technique is multi-image super resolution technique. The multi-image super resolution technique is a technique for generating a single high resolution image data by using a motion picture or a multiple continuously-shot image data (multiple frames) (for example, see PTL 2). As described above, in order to achieve a high resolution, the multi-image super resolution technique requires image data of multiple images. For this reason, the multi-image super resolution technique is unable to generate high resolution image data from a single image data.

The second super resolution technique is learning-based super resolution technique. The learning-based super resolution technique is a technique for generating a dictionary on the basis of learning in advance, and enhancing the resolution of a single image data by using the dictionary (for example, see PTL 3). Since the learning-based super resolution technique uses the dictionary, the learning-based super resolution technique can achieve a super resolution of which resolution is higher than the multi-image super resolution technique.

An image processing device using learning-based super resolution technique will be further described with reference to drawings.

The image processing device using the learning-based super resolution technique generally includes a learning phase and a super resolution phase.

FIG. 7 is a block diagram illustrating an example of a configuration of an image processing system 900 including an image processing device 910 using the learning-based super resolution technique.

The image processing system 900 includes the image processing device 910, a learning device 920, and a dictionary 930.

The learning device 920 generates data (dictionary data) held in the dictionary 930 by using a learning image 51. Namely, the learning device 920 processes the learning phase.

The learning device 920 and the learning phase will be described with reference to FIGS. 8 and 9.

FIG. 8 is a block diagram illustrating an example of a configuration of the learning device 920.

FIG. 9 is a drawing for describing the learning phase.

The learning device 920 includes a reception unit 921, a blurred image generation unit 922, a patch pair generation unit 923, and a registration unit 924.

The reception unit 921 receives a high resolution image (learning image 51) for learning, and sends the learning image 51 to the blurred image generation unit 922 and the patch pair generation unit 923.

The blurred image generation unit 922 generates a low resolution image (blurred image 52) having a lower resolution on the basis of the learning image 51. As shown in FIG. 9, the blurred image generation unit 922 may generate a plurality of blurred images 52. The blurred image generation unit 922 sends the blurred image 52 to the patch pair generation unit 923.

The patch pair generation unit 923 extracts an image in a predetermined range (high resolution patch 511) from the learning image 51. Then, the patch pair generation unit 923 extracts an image corresponding to the extracted high resolution patch 511 (low resolution patch 521) from the blurred image 52. The patch pair generation unit 923 generates a patch pair 531 obtained by combining the high resolution patch 511 and the low resolution patch 521. The patch pair generation unit 923 sends the patch pair 531 to the registration unit 924.

The registration unit 924 stores the patch pair 531 to the dictionary 930.

The explanation will be made with reference to FIG. 7 again.

As described above, the dictionary 930 stores the patch pair 531.

The image processing device 910 composes a restoration image 55 generated by making the input image 54 into a high resolution by using the patch pair 531 of the dictionary 930. Namely, the image processing device 910 processes the super resolution phase.

The image processing device 910 and the super resolution phase will be described with reference to FIGS. 10 and 11.

FIG. 10 is a block diagram illustrating an example of a configuration of the image processing device 910.

FIG. 11 is a drawing for describing a super resolution phase.

The image processing device 910 includes a patch generation unit 911, a selection unit 912, and a composite unit 913.

The patch generation unit 911 receives the input image 54. Then, the patch generation unit 911 generates a patch (input patch 541) to be compared with the low resolution patch 521 of the patch pair 531 on the basis of the input image 54. The patch generation unit 911 sends the generated input patch 541 to the selection unit 912.

The selection unit 912 selects the patch pair 531 in the dictionary 930 on the basis of the input patch 541. More specifically, the selection unit 912 operates, for example, as described below. The selection unit 912 calculates similarity between the input patch 541 and all the low resolution patches 521 of the patch pairs 531. Then, the selection unit 912 selects a patch pair 531 including the low resolution patch 521 that is the most similar. The high resolution patch 511 of the selected patch pair 531 becomes a patch used for composition (restoration patch 551).

The selection unit 912 selects the patch pairs 531 corresponding to all the input patches 541, and notifies the composite unit 913 of the selected patch pairs 531.

The composite unit 913 composes the restoration image 55 by using the high resolution patch 511 of the notified patch pair 531 as the restoration patch 551.

CITATION LIST

Patent Literature

[PLT 1] Japanese Patent Laid-Open No. 2011-081476
[PLT 2] Japanese Patent Laid-Open No. 2009-181508
[PLT 3] Japanese Patent Laid-Open No. 2011-170456

SUMMARY OF INVENTION

Technical Problem

In the learning phase, the image processing system 900 generates the patch pair 531 including the low resolution patch 521 and the high resolution patch 511, and stores the patch pair 531 to the dictionary 930.

However, a number of the factor making the input image 54 a low resolution is not singular but plural. Further, there is a case in which a plurality of factors occur with be combined. Further, there is a case in which the degrees of the effects of the factors are different in the combination. For this reason, the image processing system 900 needs to generate the blurred image 52 in view of many cases, and store the generated blurred image 52 to the dictionary 930.

Namely, there is a problem in that the above image processing system 900 requires a large capacity for the dictionary 930 and requires a large number of work-hours for generation of the dictionary 930.

Therefore, in order to reduce the capacity of the dictionary, the technique described in PTL 3 does not store the high resolution patch 511, but applies a predetermined interpolate filtering to the low resolution patch 521, and selects and stores a representing image. Then, the technique described in PTL 3 composes a high resolution image by using interpolation of the representing image (interpolate filtering)

As described above, the technique described in PTL 3 can reduce the capacity of the dictionary can be reduced, and compose the restoration image 55 applied to the interpolate filtering.

However, there is a learning image 51 of which similarity to the low resolution image 52 is high, but of which similarity with each other is low. In such case, the image processing system 900 related to the present invention can compose an appropriate restoration image 55 by using the patch pair 531 including information about the learning image 51 or the learning image 51.

However, the technique described in PTL 3 does not store information about the learning image 51 corresponding to the low resolution image 52 which is not included in the representing image. Namely, there is a problem in that the technique described in PTL 3 does not effectively use the learning image 51.

A blurred state of the input image 54 is changed. For this reason the image processing suitable for the input image 54 may not be fixed, and cannot be predicted in advance.

However, the technique described in PTL 3 described above sets a parameter of the interpolate filtering when generating a representing image. Therefore, there is a problem in that the technique described in PTL 3 cannot perform processing suitable for the input image 54.

It is an object of the present invention to provide an image processing device and an image processing method for solving the above problems, reducing the work-hours for generating a dictionary, effectively using the learning image 51, and achieving image processing suitable for the input image 54.

Solution to Problem

An image processing device according to an aspect of the present invention includes: a patch generation unit which generates an input patch used for comparison on the basis of an input image; a modification parameter estimation unit which estimates a parameter used in blurred modification on the basis of the input image; a blurred image generation unit which generates a blurred image on the basis of a learning image by using the parameter; a patch pair generation unit which generates a patch pair used to compose a restoration image on the basis of the blurred image and the learning image; a selection unit which selects a patch pair used to compose the restoration image on the basis of the input patch; and a composition unit which composes the restoration image on the basis of the patch pair selected by the selection unit.

An image processing method for an image processing device according to an aspect of the present invention includes: a CPU; and a memory which is connected to the CPU. The method includes: generating an input patch used for comparison on the basis of an input image; estimating a parameter used in blurred modification on the basis of the input image; generating a blurred image on the basis of a learning image by using the parameter; generating a patch pair used to compose a restoration image on the basis of the blurred image and the learning image; selecting a patch pair used to compose the restoration image on the basis of the input patch; and composing the restoration image on the basis of the patch pair selected by the selection means.

A computer readable non-transitory medium according to an aspect of the present invention embodying a program, the program causing a computer, which comprising: a CPU; and a memory which is connected to the CPU, to perform a method. The method includes: generating an input patch used for comparison on the basis of an input image; estimating a parameter used in blurred modification on the basis of the input image; generating a blurred image on the basis of a learning image by using the parameter; generating a patch pair used to compose a restoration image on the basis of the blurred image and the learning image; selecting a patch pair used to compose the restoration image on the basis of the input patch; and composing the restoration image on the basis of the selected patch pair.

Advantageous Effects of Invention

According to the present invention, the work-hours for generating a dictionary can be reduced, the learning image can be effectively used, and the image processing suitable for the input image can be performed.

DESCRIPTION OF EMBODIMENTS

Subsequently, exemplary embodiments of the present invention will be described with reference to drawings.

Each of the drawings is for illustrative purposes of the exemplary embodiment of the present invention. Therefore, the present invention is not limited to the description of each drawing. Same numerals are appended to the same elements in each of the drawings. Repeated explanation thereabout may be omitted.

First Exemplary Embodiment

Figure 1:
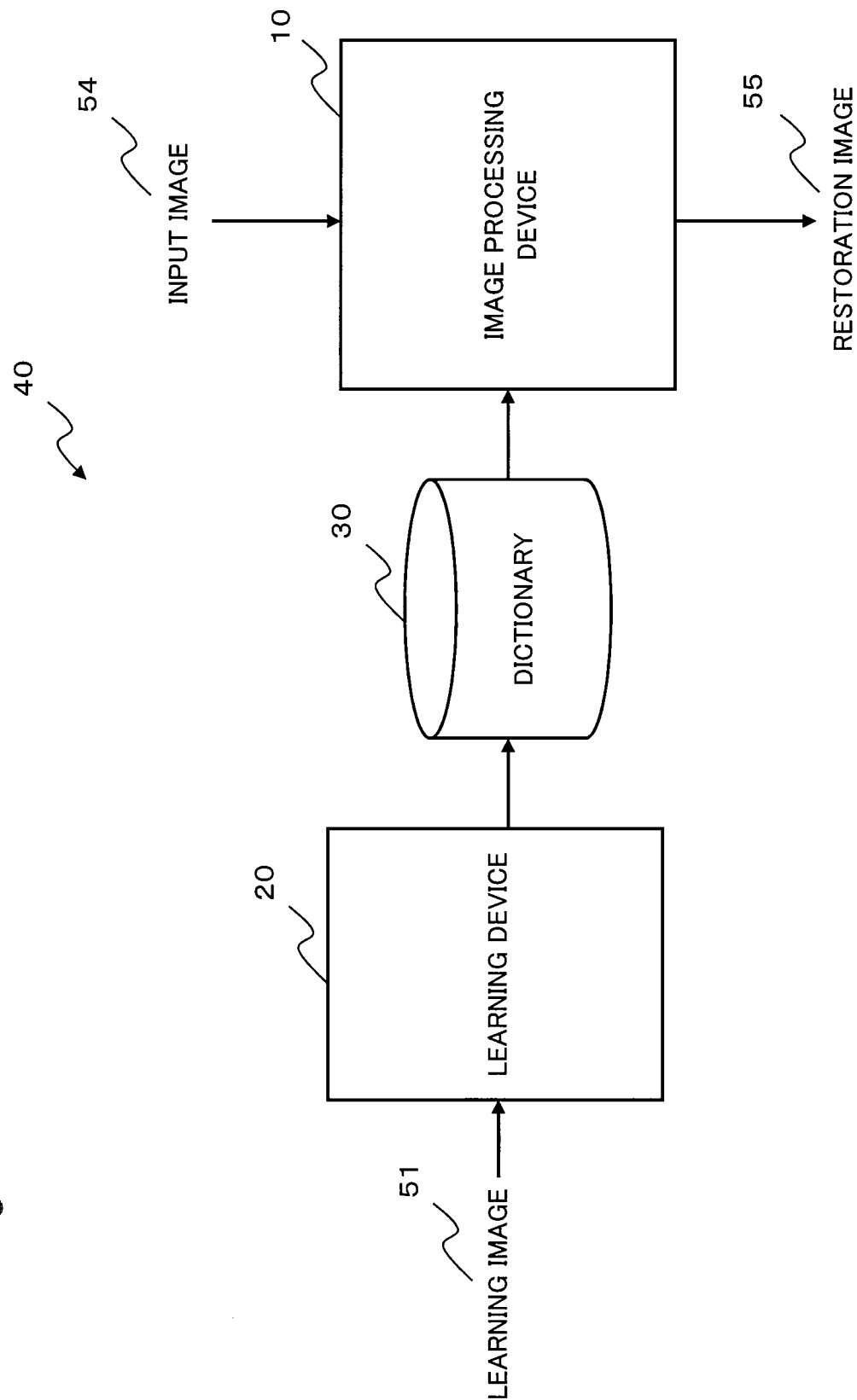
FIG. 1 is a block diagram illustrating an example of an image processing system including an image processing device according to a first exemplary embodiment of the present invention.

FIG. 1 is a block diagram illustrating an example of a configuration of an image processing system 40 including an image processing device 10 according to a first exemplary embodiment of the present invention.

The image processing system 40 includes an image processing device 10, a learning device 20, and a dictionary (memory) 30.

The image processing device 10 according to the present exemplary embodiment composes a restoration image 55 corresponding to an input image 54 by using the dictionary 30. Here, composition of the restoration image 55 means generation of the restoration image 55 by composition of the restoration patches 551.

However, as described further in details later, the image processing device 10 uses learning images 51 instead of patch pairs 531 as the data for the dictionary 30.

For this reason, the image processing system 40 may not include the learning device 20. In this case, the image processing system 40 only has to receive the learning image 51 from a device which is not shown in advance, and store the learning image 51 to the dictionary 30.

However, the image processing system 40 may carry out predetermined pre-processing on the learning image 51, and thereafter, may store the pre-processed learning image 51 to the dictionary 30. In this case, the pre-processing is not particularly limited. For example, the pre-processing may be deletion of unnecessary portion of the learning image 51, or may be normalization of an image format or shape. Alternatively, the pre-processing may be a blur processing of an image not processed by the image processing device 10.

Therefore, the learning device 20 carries out pre-processing of the learning image 51, and stores the processed learning image 51 to the dictionary 30.

Figure 2:
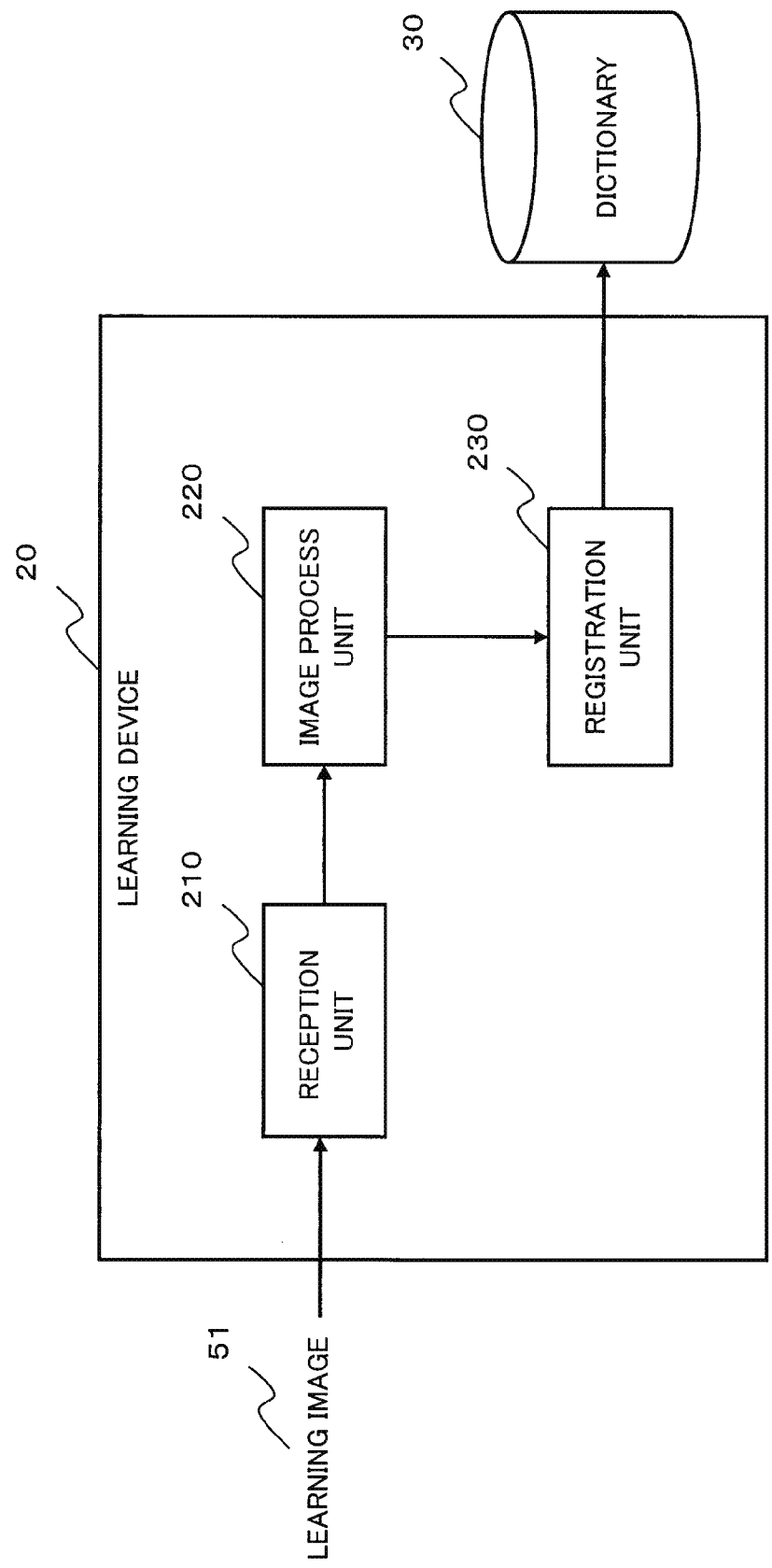
FIG. 2 is a block diagram illustrating an example of a configuration of a learning device included in the image processing system as shown in FIG. 1.

FIG. 2 is a block diagram illustrating an example of a configuration of the learning device 20.

The learning device 20 includes a reception unit 210, an image process unit 220, and a registration unit 230.

The reception unit 210 receives the learning image 51 from a device which is not shown. The reception unit 210 sends the learning image 51 to the image process unit 220.

The image process unit 220 applies predetermined pre-processing (process) to the learning image 51. The image process unit 220 sends the processed learning image 51 to the registration unit 230.

The registration unit 230 registers the processed learning image 51 to the dictionary 30.

The learning device 20 does not need to apply the same process to all the learning images 51. For example, the learning device 20 may process learning images 51 in a predetermined range, and may not process the other learning images 51. The learning device 20 may change a plurality of treatment.

Alternatively, a management device of the image processing system 40, not shown, may store a part of the learning images 51 to the dictionary 30 via the learning device 20, and may store the other learning images 51 to the dictionary 30 without passing through the learning device 20.

A learning image 51 processed by the learning device 20 and a learning image 51 not processed will be hereinafter collectively referred to as learning images 51.

The explanation will be made with reference to FIG. 1 again.

The dictionary 30 stores data used by the image processing device 10 in the super resolution phase.

As already described above, instead of the patch pair 531, the dictionary 30 receives the learning image 51, and stores the learning image 51. Namely, the dictionary 30 used by the image processing device 10 does not need to store the patch pair 531 corresponding to the blur processing.

As described above, because it is not necessary to generate the patch pair 531 when the dictionary 30 is generated, the image processing device 10 according to the present exemplary embodiment can reduce the number of work-hours for generating the dictionary 30.

Further, because it is not necessary to store the patch pair 531 to the dictionary 30, the image processing device 10 according to the present exemplary embodiment can more greatly reduce the capacity required for the dictionary than that for the dictionary 930 used in the technique of the general learning-based high resolution.

There is a case in which the learning image 51 is an image related to privacy. For this reason, the dictionary 30 may store the learning image 51 after encrypted. Further, in order to reduce the capacity, the dictionary 30 may store the learning image 51 after performing a lossless compression.

The learning device 20 may encrypt or lossless-compress the learning image 51 as the pre-processing.

Subsequently, the image processing device 10 according to the present exemplary embodiment will be described with reference to drawings.

Figure 3:
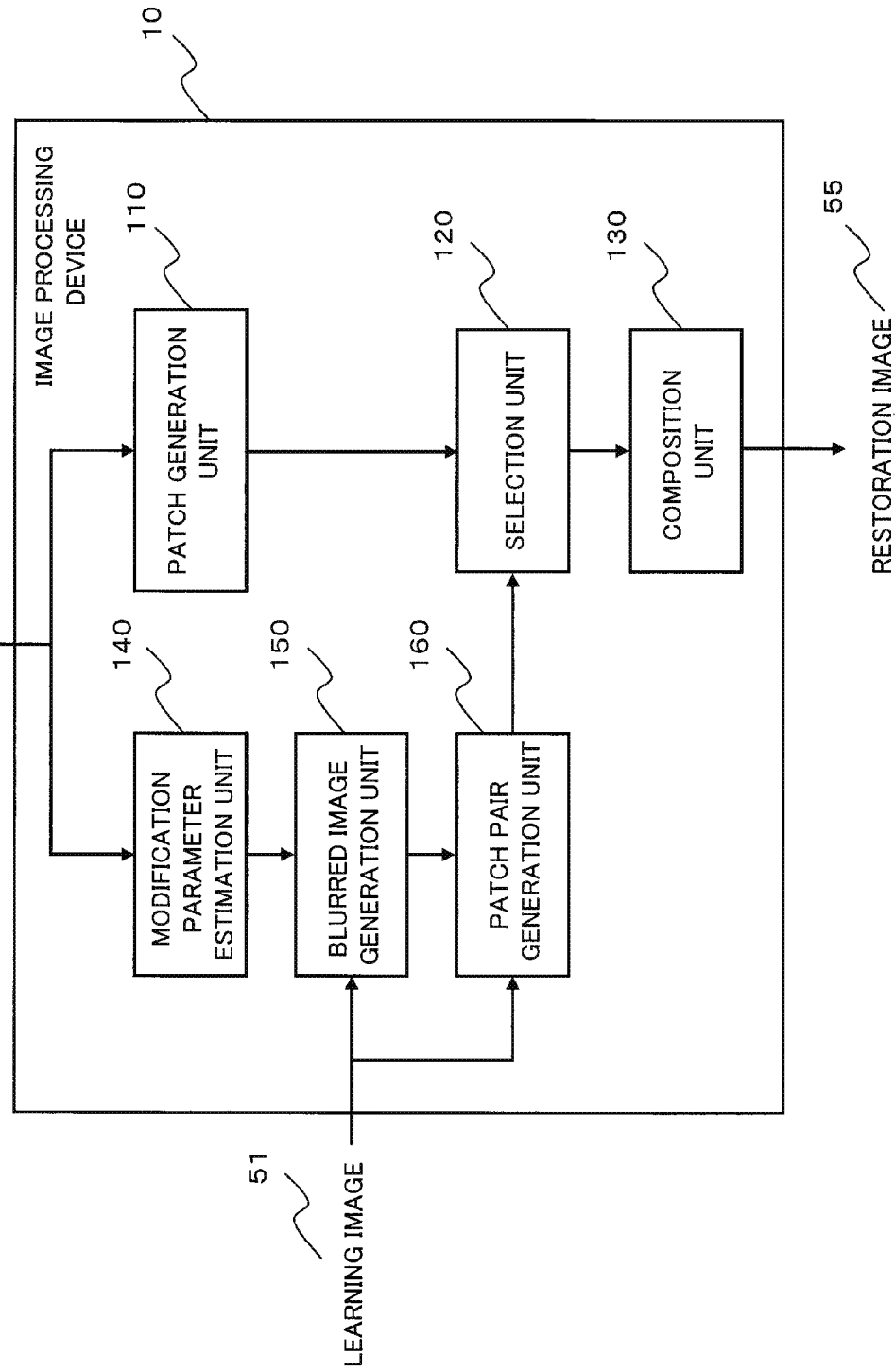
FIG. 3 is a block diagram illustrating an example of a configuration of the image processing device according to the first exemplary embodiment.

FIG. 3 is a block diagram illustrating an example of a configuration of the image processing device 10.

Figure 4:
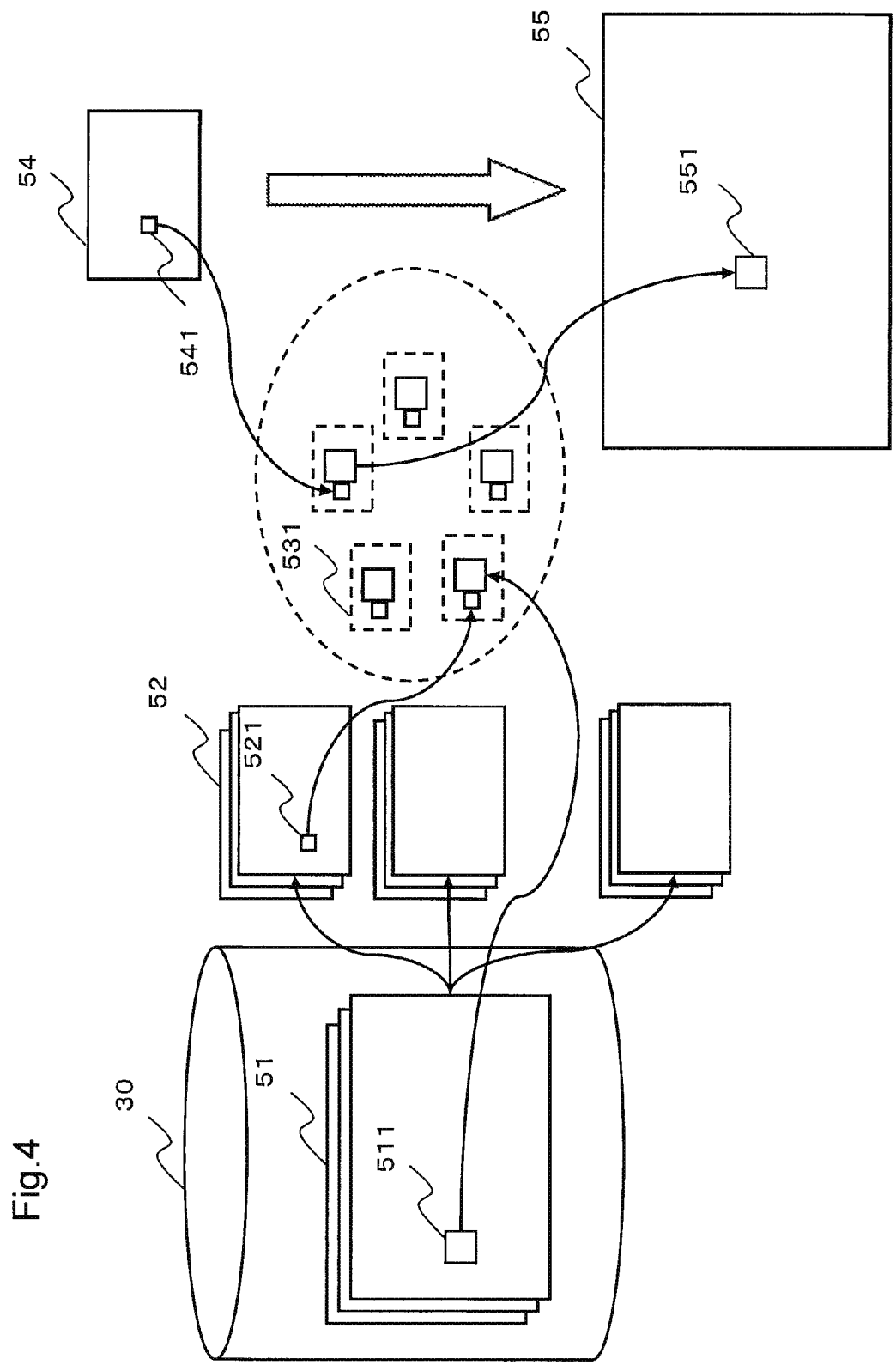
FIG. 4 is a drawing for describing operation of the image processing device according to the first exemplary embodiment.

FIG. 4 is a drawing for describing operation (super resolution phase) of the image processing device 10.

The image processing device 10 composes the restoration image 55 relating to the input image 54 by using the learning image 51.

Therefore, the image processing device 10 includes a patch generation unit 110, a selection unit 120, a composition unit 130, a modification parameter estimation unit 140, a blurred image generation unit 150, and a patch pair generation unit 160.

The patch generation unit 110 generates a patch (input patch 541) which is a unit of processing on the basis of the input image 54. The patch generation unit 110 sends the input patch 541 to the selection unit 120.

The modification parameter estimation unit 140 estimates the parameter of the blur processing (blurred modification) used by the blurred image generation unit 150 on the basis of the input image 54, and sends the estimated parameter to the blurred image generation unit 150.

The blurred image generation unit 150 generates the blurred image 52 on the basis of the learning image 51 stored in the dictionary 30 by using the received parameter. Namely, the blurred image generation unit 150 of the present exemplary embodiment can generate the blurred image 52 suitable for the input image 54.

Instead of using the received parameter as it is, the blurred image generation unit 150 may use the parameter upon changing it. For example, the blurred image generation unit 150 may generate a blurred image 52 by using the received parameter and a blurred image 52 by using the parameter changed in the predetermined range. The blurred image generation unit 150 preferably generates the blurred image 52 by using a plurality of changed parameters.

The blur processing (blurred modification) of the blurred image generation unit 150 is not particularly limited. The blurred image generation unit 150 may also use, in the blur processing, blur, reduction, deviation, lightness change, brightness change, frequency component reduction, or posture change (rotation, inclination).

For example, the blurred image generation unit 150 may use a nearest neighbor method, a bilinear method, or a bicubic method. The blurred image generation unit 150 may generate the blurred image 52 by removing a high frequency component (increasing the blur intensity) of the learning image 51. The blurred image generation unit 150 may generate the blurred image 52 by changing the posture of the learning image 51. The blurred image generation unit 150 may generate the blurred image 52 by reducing the brightness value (lowering the lightness) of the learning image 51. The blurred image generation unit 150 may retrieve, as the reduction, data of the learning image 51 with a regular interval. (This reduction processing is referred to as subsampling.) The blurred image generation unit 150 may generate the blurred image 52 by changing the position where data are retrieved from the learning image 51 as a deviation (very small deviation in particular).

The blurred image generation unit 150 preferably generates a plurality of blurred images 52 by using a plurality of blur processing. In this case, the blurred image generation unit 150 may receive a common parameter as a parameter of a plurality of blurred modifications, or may receive the parameter for each blurred modification.

The blurred image generation unit 150 may use a mechanism of general image processing. For example, for the image processing, many GPUs (Graphics Processing Units) have been developed. The GPU carries out image processing by using parallel processing at a high speed. Therefore, the blurred image generation unit 150 can reduce the processing time for generation of the blurred image 52 by using the GPU for generation of the blurred image 52.

The blurred image generation unit 150 is not limited to a single blurred modification used when the blurred image 52 is generated. The blurred image generation unit 150 may generate the blurred image 52 by using a plurality of blurred modifications.

The blurred image generation unit 150 sends the blurred image 52 to the patch pair generation unit 160.

The data sent from the modification parameter estimation unit 140 to the blurred image generation unit 150 are not limited to the parameter for the blurred modification.

For example, the modification parameter estimation unit 140 may estimate the optimum blurred modification on the basis of the input image 54, and notify the blurred image generation unit 150 of information about the blurred modification carried out by the blurred image generation unit 150.

Alternatively, for example, the modification parameter estimation unit 140 may analyze the state of the effect of a shadow included in the input image 54, and notify the blurred image generation unit 150 of information of the blurred modification that is hard to be affected by the shadow. In this case, the blurred image generation unit 150 may generate the blurred image 52 by using the blurred modification that is hard to be affected by the shadow.

The modification parameter estimation unit 140 may analyze the characteristics of an object captured in the input image 54, and notify the blurred image generation unit 150 of information about the analyzed object. In this case, the blurred image generation unit 150 may generate the blurred image 52 by using the blurred modification corresponding to an object.

For example, when there are many texts written horizontally, the blurred image generation unit 150 may use blurred modification for saving relationship in the horizontal direction. When there are many texts written vertically, the blurred image generation unit 150 may use blurred modification for saving relationship in the vertical direction.

The modification parameter estimation unit 140 may determine an object other than a target object, and estimate a parameter on the basis of the determination.

Hereinafter, the parameter refers to those including the blurred modification carried out.

The input image 54 need not be limited to an independent image. For example, the input image 54 may be a portion of a large image. In such case, the input image 54 has an image of another object in at least a portion of a periphery. When the blurred image generation unit 150 generates the blurred image 52 by using an input image 54 having another image in the periphery, there is a case in which the color of the image in the periphery of the input image 54 spreads into the inside of the blurred image 52. For this reason, the modification parameter estimation unit 140 may notify the color of the periphery of the input image 54 as a parameter. When the blurred image generation unit 150 generates the blurred image 52 on the basis of the learning image 51, the blurred image generation unit 150 generates the blurred image 52 to which the color of the periphery received is applied.

The patch pair generation unit 160 generates the patch pair 531 including a combination of the high resolution patch 511 of the learning image 51 and the low resolution patch 521 of the blurred image 52 corresponding to the learning image 51. The patch pair generation unit 160 generates the patch pairs 531 for all the high resolution patches 511 of the learning images 51. The patch pair generation unit 160 generates the patch pairs 531 for the low resolution patches 521 of all the blurred images 52 relating to the learning images 51.

The patch pair generation unit 160 of the present exemplary embodiment only has to generate the patch pairs 531 corresponding to all the learning images 51. However, for example, the patch pair generation unit 160 may select a learning image 51 for generating a patch pair 531 on the basis of information about the input image 54.

As already described above, the blurred image generation unit 150 generates the blurred image 52 suitable for the input image 54. Therefore, the patch pair generation unit 160 of the present exemplary embodiment can generate the patch pair 531 including the low resolution patch 521 suitable for the input image 54.

The patch pair generation unit 160 sends the patch pair 531 to the selection unit 120.

The selection unit 120 selects the patch pair 531 corresponding to the input patch 541 from the patch generation unit 110. The patch pair generation unit 160 generates the patch pair 531 suitable for the input image 54. Therefore, the selection unit 120 can select the patch pair 531 suitable for the input image 54.

The selection unit 120 of the present exemplary embodiment is not particularly limited in the selection of the patch pair 531. For example, the selection unit 120 may select a patch pair 531 on the basis of the similarity in the brightness between patches. As the similarity in the brightness, the selection unit 120 may use, for example, a square sum square of difference in the brightness of pixels in the patches, or a summation of absolute values of the brightness differences of the pixels. The selection unit 120 may select the patch pair 531 on the basis of an angle between vectors in a case where patches are vector data. The selection unit 120 sends the selected patch pair 531 to the composition unit 130.

The composition unit 130 composes the restoration image 55 on the basis of the received patch pair 531. The selection unit 120 selects the patch pair 531 suitable for the input image 54. Therefore, the composition unit 130 can compose the restoration image 55 suitable for the input image 54.

In the above explanation, each element of the image processing device 10 sends generated data to a subsequent element. However, the element of the image processing device 10 according to the present exemplary embodiment may not be necessarily limited thereto.

For example, the image processing device 10 may further include a storage unit, not shown. In this case, each element of the image processing device 10 may store the generated data to the storage unit. Then, each element of the image processing device 10 may read necessary data from the storage unit.

As described above, the image processing device 10 according to the present exemplary embodiment can perform image processing suitable for the input image 54 by reducing the work-hours for generating the dictionary 30 and effectively using the learning image 51.

The reason is as follows.

The image processing device 10 stores the learning image 51 as data of the dictionary 30, and uses the learning image 51 in the super resolution phase.

The dictionary 30 may store the learning image 51. Therefore, the image processing device 10 can reduce the work-hours for generating data stored in the dictionary 30.

The image processing device 10 generates the blurred image 52 on the basis of the learning image 51 in the composition of the restoration image 55. Therefore, the image processing device 10 can effectively use the learning image 51.

Further, the modification parameter estimation unit 140 of the image processing device 10 notifies the blurred image generation unit 150 of a blurred modification suitable for the input image 54. Therefore, the image processing device 10 can compose the restoration image 55 suitable for the input image 54.

Example of Modification

The configuration of the image processing device 10 is not limited to what has been described above.

For example, the image processing device 10 may include the dictionary 30.

The image processing device 10 may divide each element into a plurality of elements. For example, the modification parameter estimation unit 140 may be divided to elements corresponding to each modification.

The image processing device 10 may make a plurality of elements into a single element. For example, the blurred image generation unit 150 and the patch pair generation unit 160 may be configured to be a single element generating the patch pair 531 from the learning image 51.

Further, the image processing device 10 according to the present exemplary embodiment may be achieved as a computer including a CPU (Central Processing Unit), a ROM (Read Only Memory), a RAM (Random Access Memory), an IO (Input/Output unit), and an NIC (Network Interface Circuit or Network interface Card).

Figure 5:
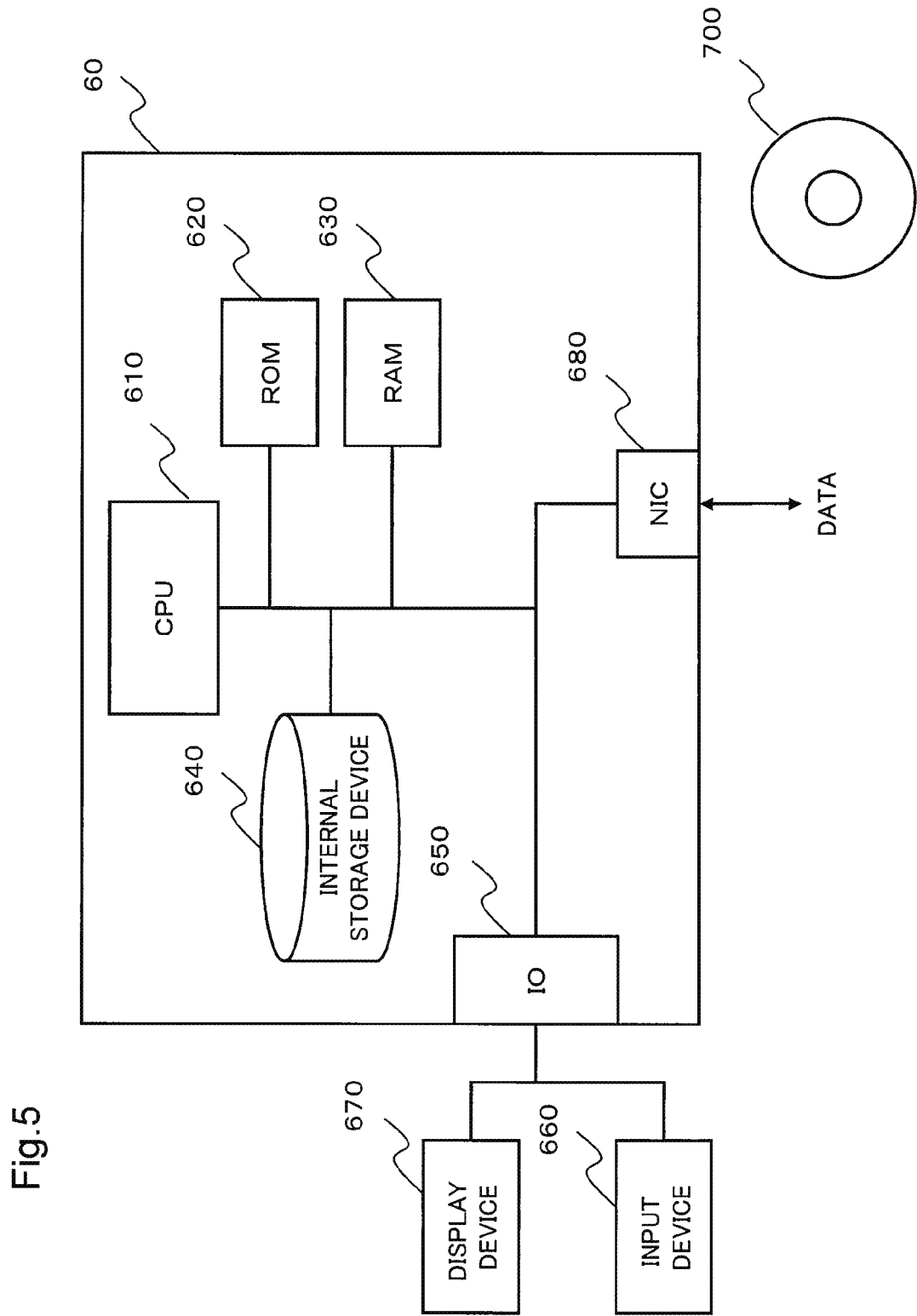
FIG. 5 is a block diagram illustrating another example of a configuration of the image processing device according to the first exemplary embodiment.

FIG. 5 is a block diagram illustrating an example of a configuration of an image processing device 60 which is another configuration of the present exemplary embodiment.

The image processing device 60 includes a CPU 610, a ROM 620, a RAM 630, an internal storage device 640, an IO 650, an input device 660, a display device 670, and an NIC 680, thus constituting a computer.

The CPU 610 reads a program from the ROM 620 or the internal storage device 640. The CPU 610 achieves each function as the patch generation unit 110, the selection unit 120, the composition unit 130, the modification parameter estimation unit 140, the blurred image generation unit 150, and the patch pair generation unit 160 of the image processing device 10 of FIG. 3 on the basis of the read program. When the CPU 610 achieves each function, the CPU 610 uses the RAM 630 and the internal storage device 640 as a temporary storage. The CPU 610 receives input data via the IO 650 from the input device 660, and displays the data on the display device 670. The CPU 610 may store the program to the RAM 630, and may operate on the basis of the program stored in the RAM 640.

The CPU 610 may read the program included in a storage medium 700 storing the program in such a manner that the program can be read by a computer by using a storage medium reading device, not shown. The CPU 610 may receive a program from an external device, not shown, via the NIC 680.

The ROM 620 stores the program executed by the CPU 610 and fixed data. The ROM 620 is, for example, a P-ROM (Programmable-ROM) and a flash ROM. As described above, the ROM 620 is a non-transitory storage device.

The RAM 630 temporarily stores data and the program executed by the CPU 610. The RAM 630 is, for example, a D-RAM (Dynamic-RAM). As described above, the RAM 630 is a transitory storage device.

The internal storage device 640 stores data or programs stored for a long time by the image processing device 60. The internal storage device 640 may operate as a temporary storage device for the CPU 610. The internal storage device 640 may store the blurred image 52 or the patch pair 531. The internal storage device 640 is, for example, a hard disk device, a magneto-optical disk device, a SSD (Solid State Drive) or a disk array device. As described above, the internal storage device 640 is a non-transitory storage device.

The internal storage device 640 or the RAM 630 may operate as the dictionary 30.

The IO 650 intermediates data between the CPU 610, and the input device 660 and the display device 670. The IO 650 is, for example, an TO interface card.

The input device 660 is an input unit for receiving an input instruction from an operator of the image processing device 60. The input device 660 is, for example, a keyboard, a mouse, or a touch panel.

The display device 670 is a display unit of the image processing device 60. The display device 670 is, for example, a liquid crystal display.

The NIC 680 relays exchange of information with another device (e.g., a device for transmitting the input image 54, not shown) via a network. The NIC 680 is, for example, a LAN (Local Area Network) card.

The image processing device 60 configured as described above can obtain the same effects as those of the image processing device 10.

This is because the CPU 610 of the image processing device 60 can achieve the same operation as the image processing device 10 on the basis of the program.

Second Exemplary Embodiment

The image processing device 10 may repeat the processing described above.

Figure 6:
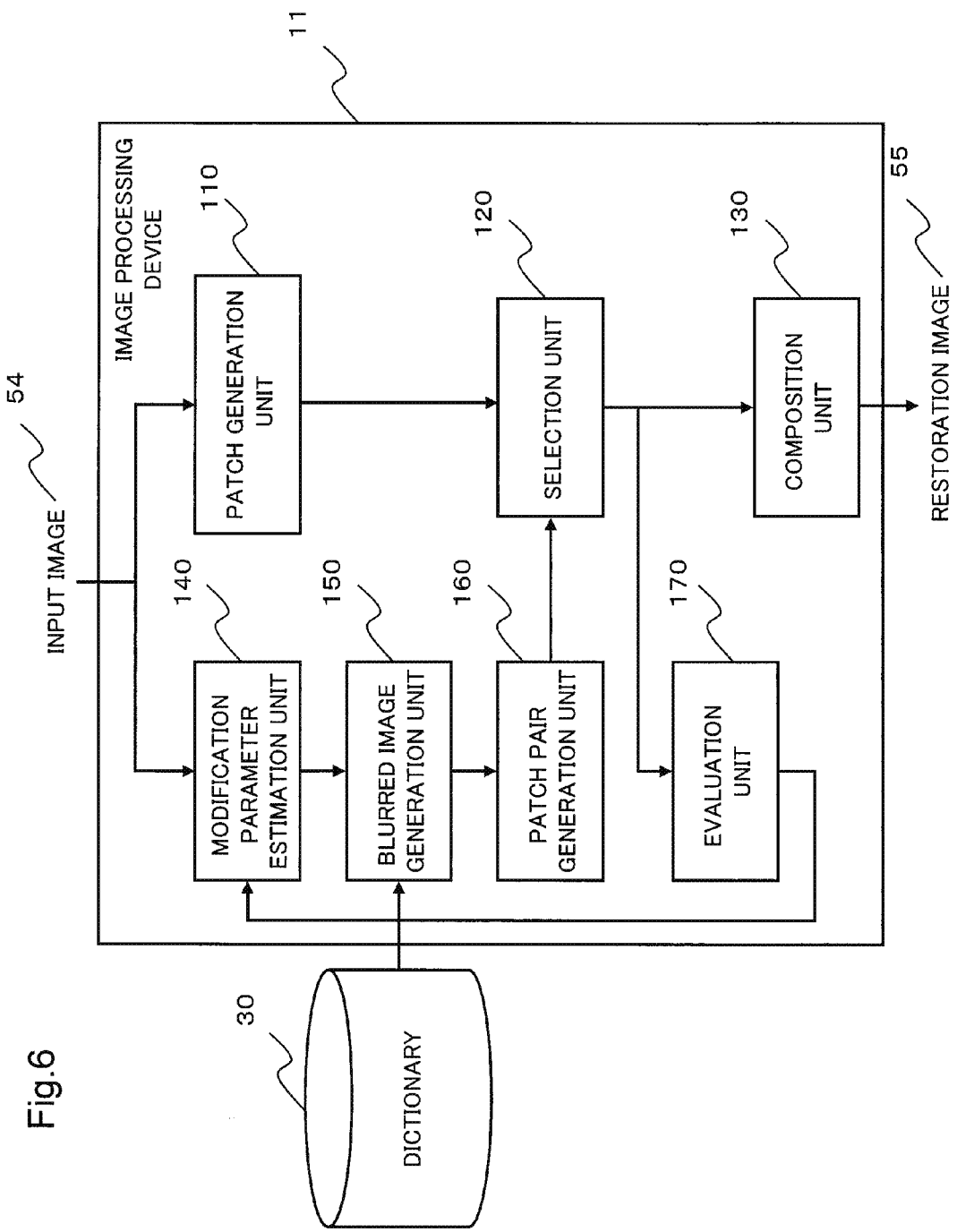
FIG. 6 is a block diagram illustrating an example of a configuration of an image processing device according to a second exemplary embodiment.
Figure 7:
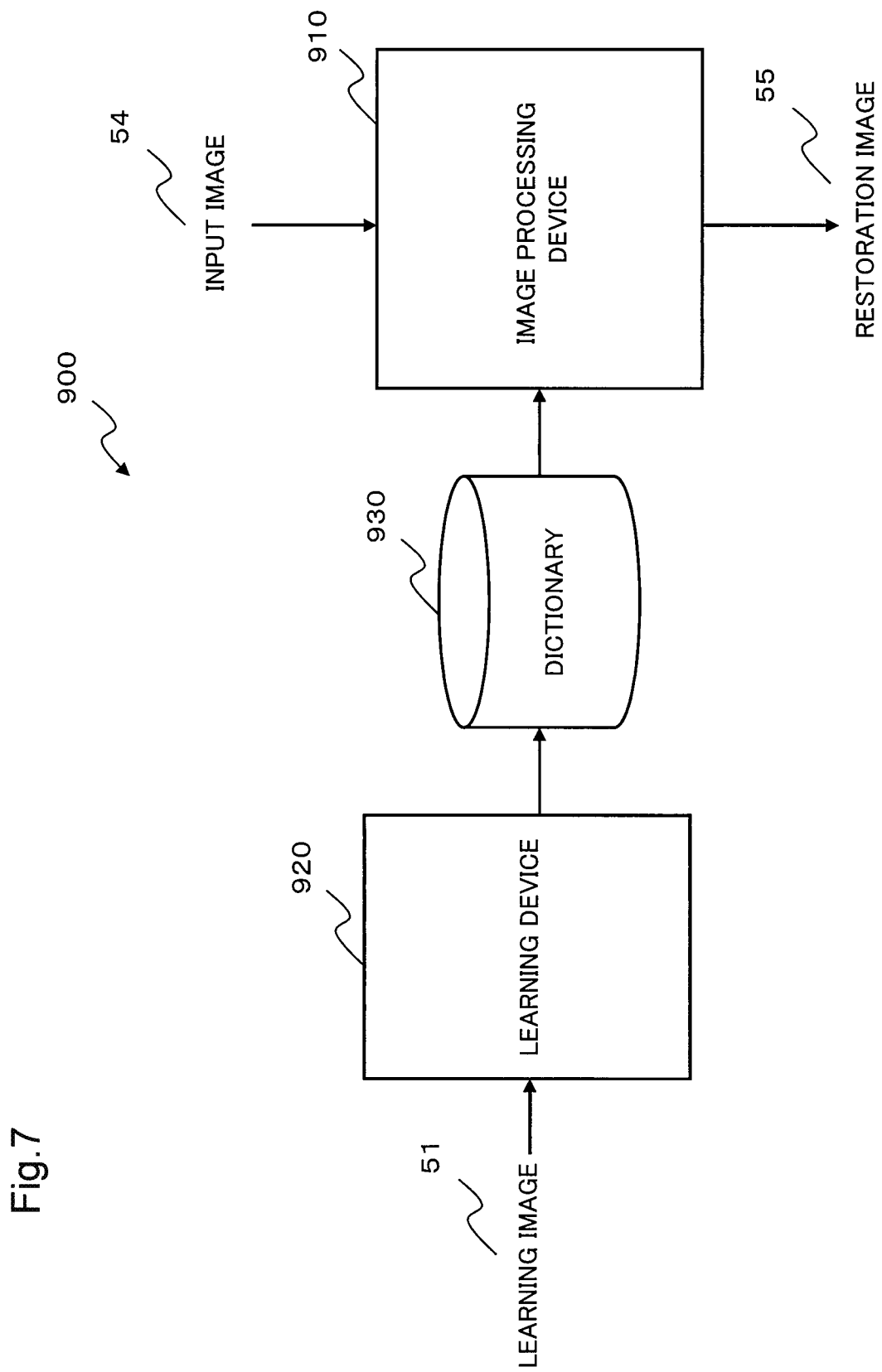
FIG. 7 is a block diagram illustrating an example of a configuration of a general image processing system.
Figure 8:
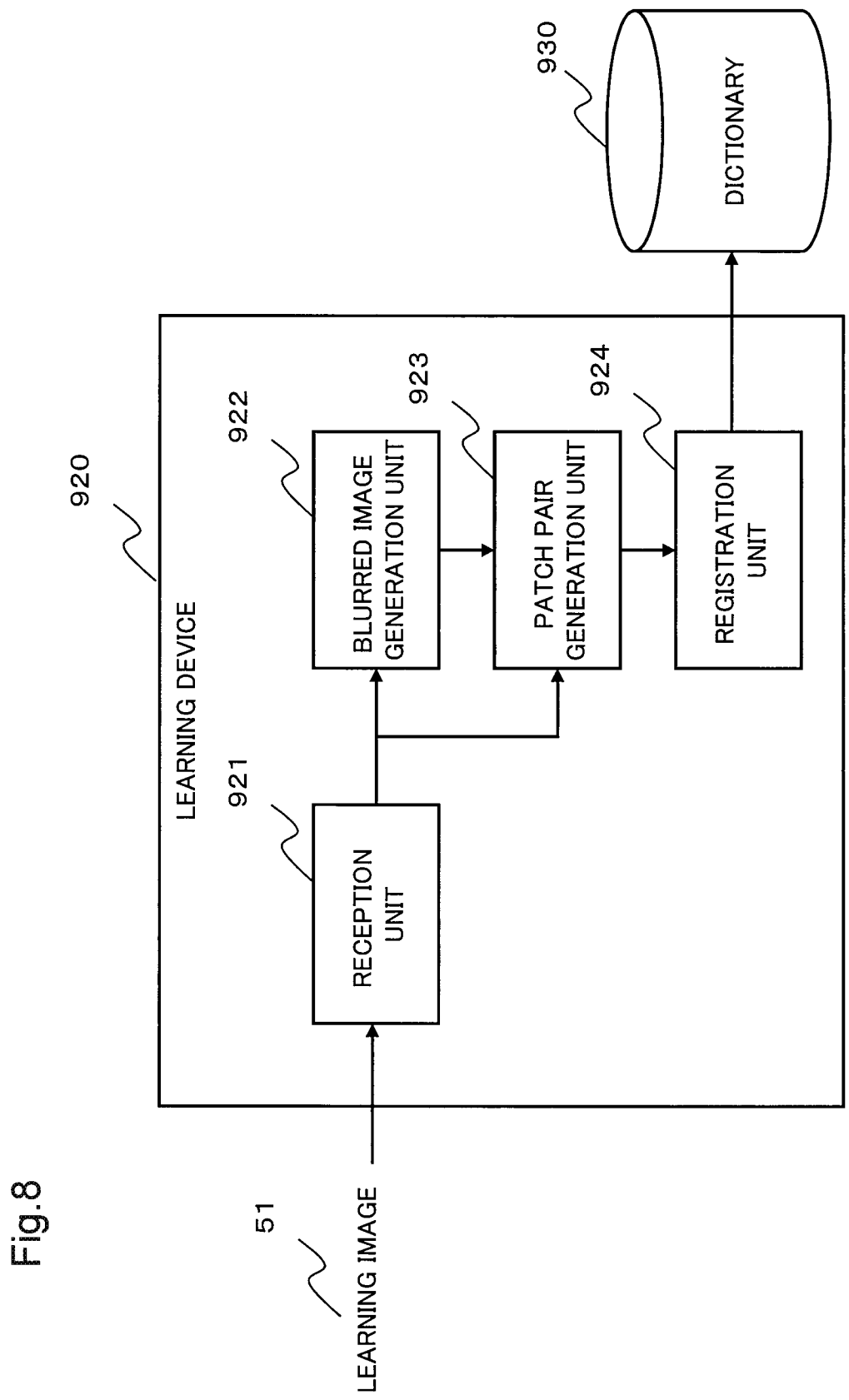
FIG. 8 is a block diagram illustrating an example of a configuration of a general learning device.
Figure 9:
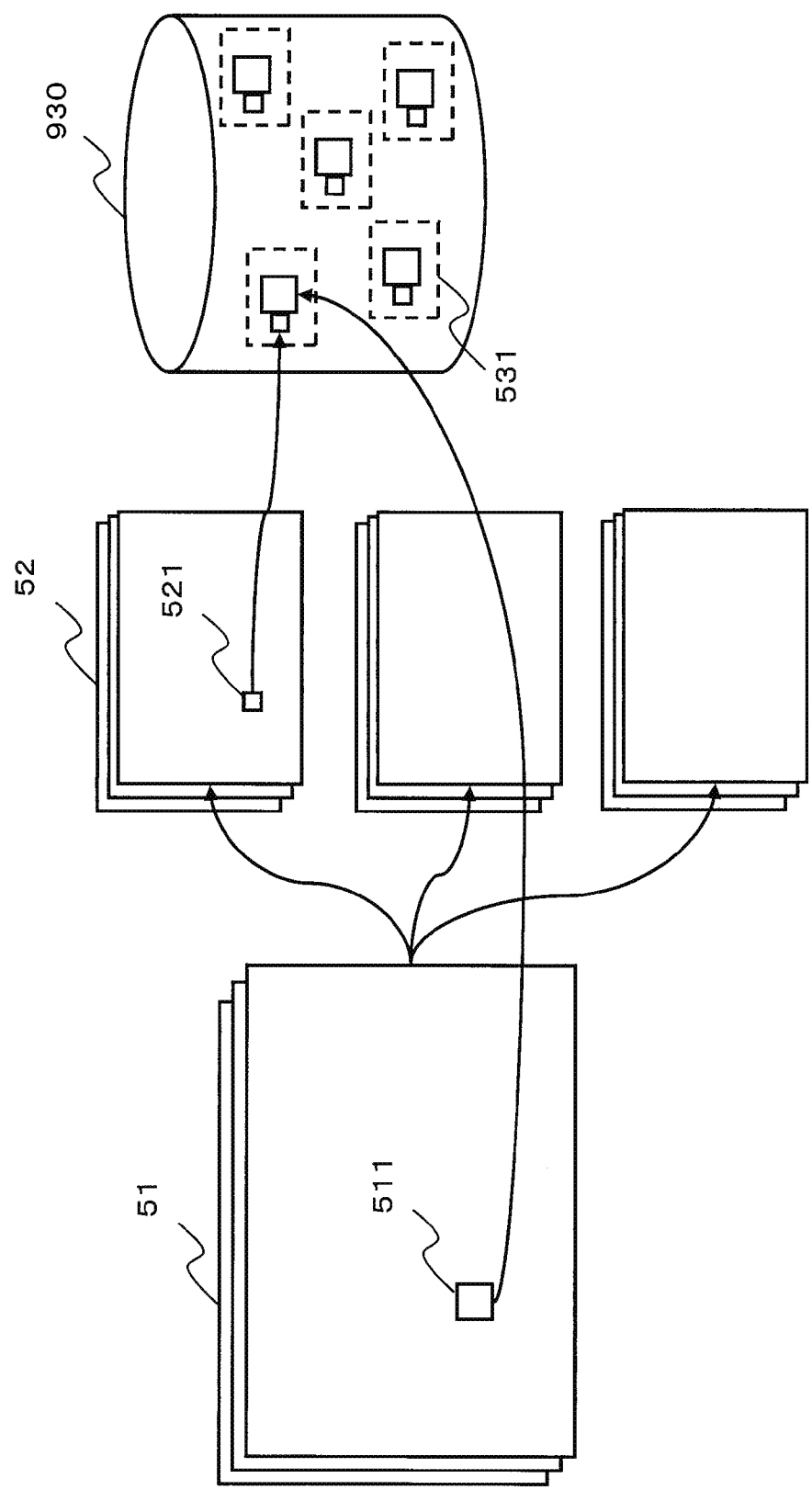
FIG. 9 is a drawing for describing a learning phase.
Figure 10:
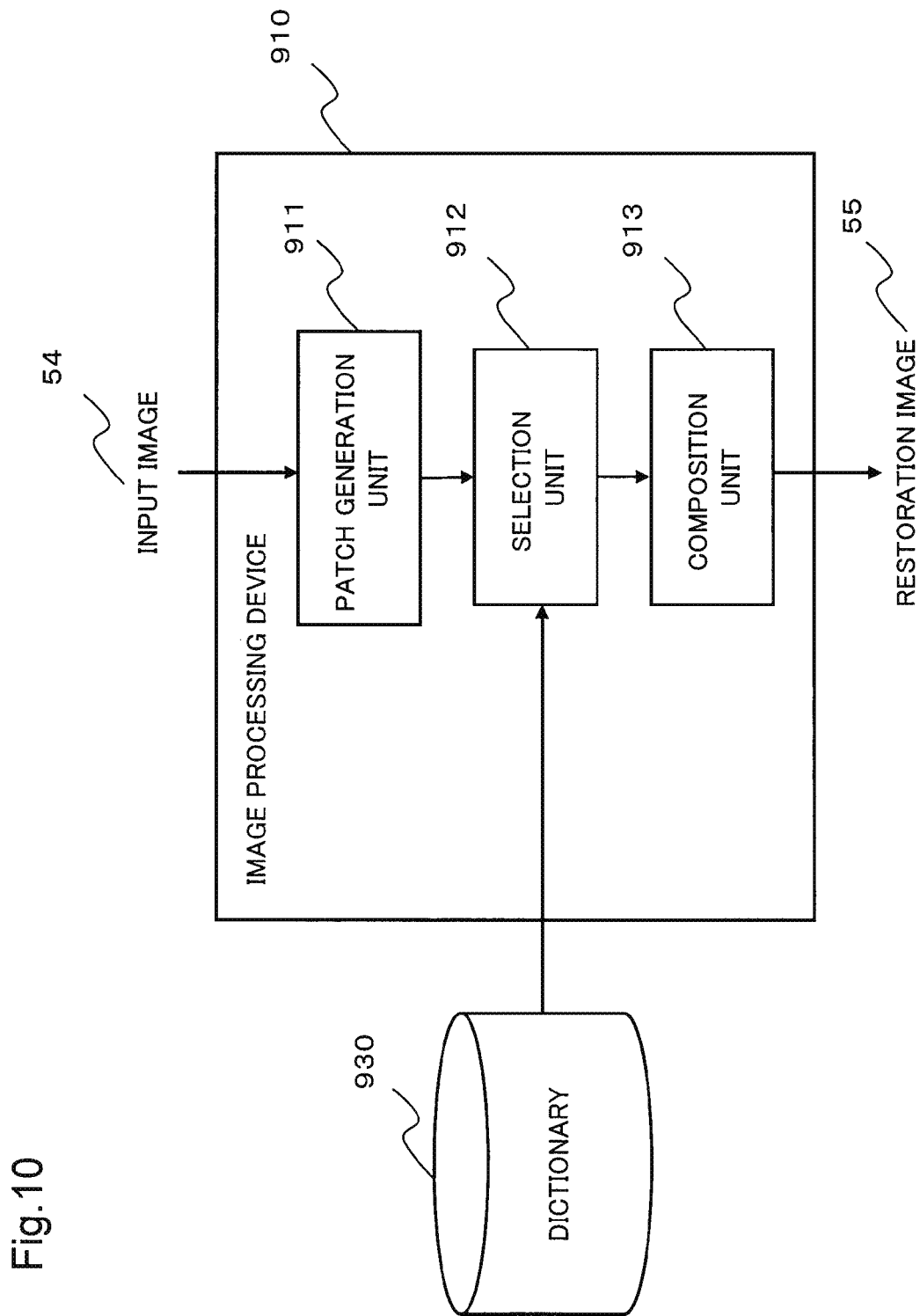
FIG. 10 is a block diagram illustrating an example of a configuration of a general image processing device.
Figure 11:
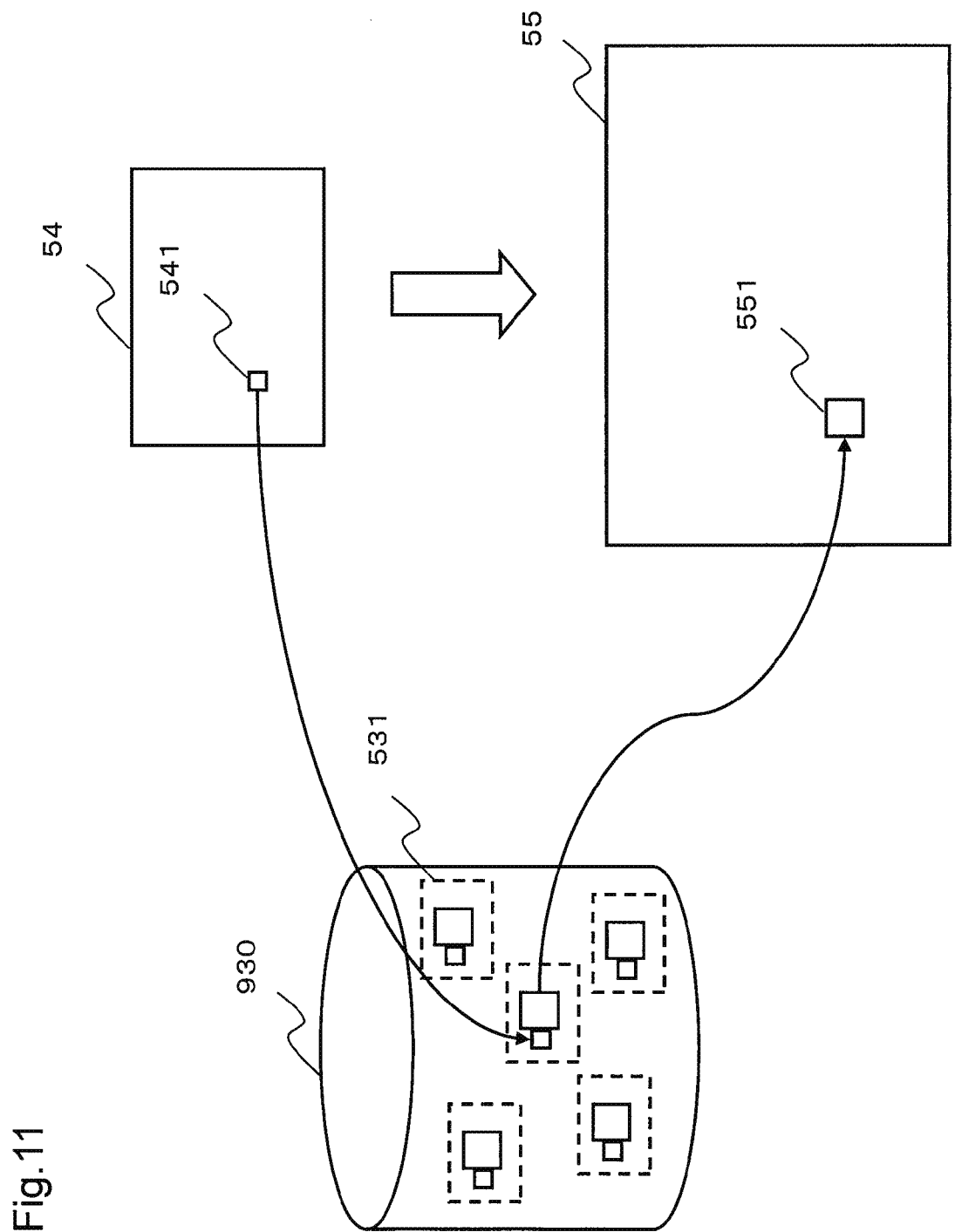
FIG. 11 is a drawing for describing a super resolution phase.

FIG. 6 is a block diagram illustrating an example of a configuration of an image processing device 11 according to the second exemplary embodiment.

The image processing device 11 includes an evaluation unit 170 in addition to the configuration of the image processing device 10.

Because the image processing device 11 is the same as the image processing device 10 according to the first exemplary embodiment except the configuration and the operation related to the evaluation unit 170, explanation about the same configuration and operation is omitted.

The image processing device 11 according to the present exemplary embodiment may be achieved as a computer including a CPU 610, a ROM 620, and a RAM 630 like the image processing device 10 as shown in FIG. 3.

The evaluation unit 170 evaluates the degree of optimization of the patch pair 531 selected by the selection unit 120, and calculates a value indicating the degree of optimization (hereinafter referred to as "fitness") as an evaluation result.

The method used by the evaluation unit 170 for evaluation is not particularly limited.

For example, the evaluation unit 170 may calculate the fitness by evaluating the degree of matching of pixels in an overlapping portion between the high resolution patch 511 (i.e., restoration patch 551) included in the selected patch pair 531 (i.e., restoration patch 551) and an adjacent restoration patch 551. Further, the evaluation unit 170 may use, as the restoration patch 551 for evaluating the matching in the overlap portion, the restoration patches 551 adjacent in the vertical direction and the horizontal direction or the restoration patch 551 in one of the vertical direction and the horizontal direction. The evaluation unit 170 may evaluate the distribution of the degree of matching, and calculate the fitness. The evaluation unit 170 may calculate the fitness by evaluating the similarity between the input patch 541 and the low resolution patch 521 of the selected patch pair 531.

The evaluation unit 170 notifies the modification parameter estimation unit 140 of the evaluation result (fitness).

The modification parameter estimation unit 140 changes the parameter on the basis of the evaluation result of the evaluation unit 170, and sends the changed parameter to the blurred image generation unit 150. Namely, the modification parameter estimation unit 140 can improve the parameter on the basis of the selected patch pair 531.

The blurred image generation unit 150 generates the blurred image 52 on the basis of the improved parameter.

The patch pair generation unit 160 generates the patch pair 531 on the basis of the improved blurred image 52.

The selection unit 120 selects the patch pair 531 corresponding to the input patch 541 from the improved patch pair 531.

The composition unit 130 composes the restoration image 55 on the basis of the improved patch pair 531. Therefore, the composition unit 130 can improve the restoration image 55.

As described above, the image processing device 11 can improve the restoration image 55 on the basis of the selected patch pair 531.

The image processing device 11 does not need to limit this processing into a single execution. The image processing device 11 may repeat this processing until the evaluation of the evaluation unit 170 converts into a predetermined range. The image processing device 11 may repeat this processing a predetermined number of times.

The modification parameter estimation unit 140 may change the parameter by using a plurality of evaluation results.

The image processing device 11 may limit the degree of improvement. For example, the modification parameter estimation unit 140 may limit the amount of change of the parameter into a predetermined range. When the amount of change is large, there is a case in which it is hard to converge the effect of improvement based on the change. In such case, the image processing device 11 can improve the convergence state of the improvement processing on the basis of the limitation of the range of the amount of change.

The evaluation unit 170 may evaluate the situation of the composite processing with the composition unit 130 in addition to the selection of the selection unit 120. For example, the evaluation unit 170 may evaluate similarity between the restoration patch 551 and the high resolution patch 511 of the patch pair 531.

In this case, the image processing device 11 can improve the composition of the restoration image 55 on the basis of the state of the restoration image 55 in addition to the patch pair 531.

As described above, the image processing device 11 according to the second exemplary embodiment can further obtain the effect of composing the more appropriate restoration image 55 in addition to the effect of the image processing device 11.

The reason for this is as follows.

The image processing device 11 improves the patch pair 531 on the basis of the evaluation of the patch pair 531 of the evaluation unit 170. As a result, the image processing device 11 can improve the restoration image 55.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-244187, filed on Nov. 6, 2012, the disclosure of which is incorporated herein in its entirety by reference.

The whole or part of the exemplary embodiments disclosed above can be described as, but not limited to, the following supplementary notes.

(Supplementary Note 1)

An image processing device includes: a patch generation unit which generates an input patch used for comparison on the basis of an input image; a modification parameter estimation unit which estimates a parameter used in blurred modification on the basis of the input image; a blurred image generation unit which generates a blurred image on the basis of a learning image by using the parameter; a patch pair generation unit which generates a patch pair used to compose a restoration image on the basis of the blurred image and the learning image; a selection unit which selects a patch pair used to compose the restoration image on the basis of the input patch; and a composition unit which composes the restoration image on the basis of the patch pair selected by the selection unit (Supplementary Note 2)

The image processing device according to supplementary note claim 1 further includes: an evaluation unit which evaluates the patch pair selected by the selection unit, wherein the modification parameter estimation unit estimates the parameter on the basis of a result of the evaluation.

(Supplementary Note 3)

The image processing device according to supplementary note 2, wherein the evaluation unit evaluates a result of the composition means.

(Supplementary Note 4)

The image processing device according to supplementary note 2 or 3, wherein the evaluation unit repeats the evaluation for a predetermined number of times or until the evaluation result is within a predetermined range.

(Supplementary Note 5)

The image processing device according to any one of supplementary notes 1 to 4, wherein the modification parameter estimation unit estimates a parameter in view of at least one of a color of a periphery of the input image, a shadow, or an object included in the image.

(Supplementary Note 6)

An image processing method for an image processing device, which comprising: a CPU; and a memory which is connected to the CPU, includes: generating an input patch used for comparison on the basis of an input image; estimating a parameter used in blurred modification on the basis of the input image; generating a blurred image on the basis of a learning image by using the parameter; generating a patch pair used to compose a restoration image on the basis of the blurred image and the learning image; selecting a patch pair used to compose the restoration image on the basis of the input patch; and composing the restoration image on the basis of the selected patch pair.

(Supplementary Note 7)

The image processing method according to supplementary note 6, further includes: evaluating the selected patch pair; and estimating the parameter on the basis of a result of the evaluation.

(Supplementary Note 8)

The image processing method according to supplementary note 7, wherein evaluating a result of the composition in the evaluation.

(Supplementary Note 9)

The image processing method according to supplementary note 7 or 8, wherein repeating the evaluation for a predetermined number of times or until the evaluation result is within a predetermined range.

(Supplementary Note 10)

The image processing method according to any one of supplementary notes 6 to 9, wherein estimating a parameter in view of at least one of a color of a periphery of the input image, a shadow, or an object included in the image in the estimation of the parameter.

(Supplementary Note 11)

A computer readable non-transitory medium embodying a program, the program causing a computer, which comprising: a CPU; and a memory which is connected to the CPU, to execute perform a method, the method includes: generating an input patch used for comparison on the basis of an input image; estimating a parameter used in blurred modification on the basis of the input image; generating a blurred image on the basis of a learning image by using the parameter; generating a patch pair used to compose a restoration image on the basis of the blurred image and the learning image; selecting a patch pair used to compose the restoration image on the basis of the input patch; and composing the restoration image on the basis of the selected patch pair.

(Supplementary Note 12)

The program method according to supplementary note 11 further comprising: evaluating the selected patch pair; and estimating the parameter on the basis of a result of the evaluation.

(Supplementary Note 13)

The method according to supplementary note 12, wherein evaluating a result of the composition in evaluating.

(Supplementary Note 14)

The method according to supplementary note 12 or 13, wherein repeating the evaluation for a predetermined number of times or until the evaluation result is within a predetermined range.

(Supplementary Note 15)

The method according to any one of supplementary notes 11 to 14, wherein estimating a parameter in view of at least one of a color of a periphery of the input image, a shadow, or an object included in the image in estimating the parameter.

(Supplementary Note 16)

An image processing device includes:

blurred image generation means for generating a blurred image from a learning image stored in advance on the basis of a degree of blur of an input image;

selection means for selecting a part of the learning image corresponding to a part of the blurred image that is similar to a part of the input image; and composition means for composing the restoration image on the basis of the part of the learning image selected by the selection means.

(Supplementary Note 17)
An image processing method includes:
generating a blurred image from a learning image stored in advance on the basis of a degree of blur of an input image;
selecting a part of the learning image corresponding to a part of the blurred image that is similar to a part of the input image; and
composing the restoration image on the basis of the part of the selected learning image.

(Supplementary Note 18)
A computer readable non-transitory medium embodying a program, the program causing a computer, which comprising: a CPU; and a memory which is connected to the CPU, to perform a method, the method includes:
generating a blurred image from a learning image stored in advance on the basis of a degree of blur of an input image;
selecting a part of the learning image corresponding to a part of the blurred image that is similar to a part of the input image; and
composing the restoration image on the basis of the part of the selected learning image.

REFERENCE SINGS LIST

10 Image processing device
11 Image processing device
20 Learning device
30 Dictionary
40 Image processing system
51 Learning image
52 Blurred image
54 Input image
55 Restoration image
60 Image processing device
110 Patch generation unit
120 Selection unit
130 Composition unit
140 Modification parameter estimation unit
150 Blurred image generation unit
160 Patch pair generation unit
170 Evaluation unit
210 Reception unit
220 Image process unit
230 Registration unit
511 High resolution patch
521 Low resolution patch
531 Patch pair
541 Input patch
551 Restoration patch
610 CPU
620 ROM
630 RAM
640 Internal storage device
650 IO
660 Input device
670 Display device
680 NIC
700 Storage medium
900 Image processing system
910 Image processing device
911 Patch generation unit
912 Selection unit
913 Composition unit
920 Learning device
921 Reception unit
922 Blurred image generation unit
923 Patch pair generation unit
924 Registration unit

What is claimed is:

1. An image processing device comprising:
a central processing unit (CPU); and
a memory, connected to the CPU, having instructions stored therein that when executed by the CPU comprise:
a patch generation unit which generates an input patch used for comparison on the basis of an input image;
a modification parameter estimation unit which estimates a parameter used in blurred modification on the basis of the input image;
a blurred image generation unit which generates a blurred image on the basis of a learning image by using the parameter;
a patch pair generation unit which generates a patch pair used to compose a restoration image on the basis of the blurred image and the learning image;
a selection unit which selects a patch pair used to compose the restoration image on the basis of the input patch;
a composition unit which composes the restoration image on the basis of the patch pair selected by the selection unit, and
an evaluation unit which evaluates the patch pair selected by the selection unit, wherein
the modification parameter estimation unit estimates the parameter on the basis of a result of the evaluation.

2. The image processing device according to claim 1, wherein
the evaluation unit evaluates a result of the composition means.

3. The image processing device according to claim 1, wherein
the evaluation unit repeats the evaluation for a predetermined number of times or until the evaluation result is within a predetermined range.

4. The image processing device according to claim 1, wherein
the modification parameter estimation unit estimates a parameter in view of at least one of a color of a periphery of the input image, a shadow, or an object included in the image.

5. An image processing method for an image processing device, which comprising: a CPU; and a memory which is connected to the CPU, comprising:
generating an input patch used for comparison on the basis of an input image;
estimating a parameter used in blurred modification on the basis of the input image;
generating a blurred image on the basis of a learning image by using the parameter;
generating a patch pair used to compose a restoration image on the basis of the blurred image and the learning image;
selecting a patch pair used to compose the restoration image on the basis of the input patch;
composing the restoration image on the basis of the selected_patch pair; and
evaluating the selected patch pair, wherein
the parameter is estimated on the basis of a result of the evaluation.

6. The image processing method according to claim 5, wherein evaluating a result of the composition in the evaluation.

7. The image processing method according to claim 5, wherein repeating the evaluation for a predetermined number of times or until the evaluation result is within a predetermined range.

8. The image processing method according to claim 5, wherein
estimating a parameter in view of at least one of a color of a periphery of the input image, a shadow, or an object included in the image in the estimation of the parameter.

9. A computer readable non-transitory medium embodying a program, the program causing a computer, which comprising: a CPU; and a memory which is connected to the CPU, to perform a method, the method comprising:
generating an input patch used for comparison on the basis of an input image;
estimating a parameter used in blurred modification on the basis of the input image;
generating a blurred image on the basis of a learning image by using the parameter;
generating a patch pair used to compose a restoration image on the basis of the blurred image and the learning image;
selecting a patch pair used to compose the restoration image on the basis of the input patch;
composing the restoration image on the basis of the selected patch pair; and
evaluating the selected patch pair, wherein
the parameter is estimated on the basis of a result of the evaluation.

10. The computer-readable non-transitory medium according to claim 9, wherein evaluating a result of the composition in evaluating.

11. The computer-readable non-transitory medium according to claim 9, wherein repeating the evaluation for a predetermined number of times or until the evaluation result is within a predetermined range.

12. The computer-readable non-transitory medium according to claim 9, wherein
estimating a parameter in view of at least one of a color of a periphery of the input image, a shadow, or an object included in the image in estimating the parameter.

13. An image processing device comprising:
patch generation means for generating an input patch used for comparison on the basis of an input image;
modification parameter estimation means for estimating a parameter used in blurred modification on the basis of the input image;
blurred image generation means for generating a blurred image on the basis of a learning image by using the parameter;
patch pair generation means for generating a patch pair used to compose a restoration image on the basis of the blurred image and the learning image;
selection means for selecting a patch pair used to compose the restoration image on the basis of the input patch; and
composition means for composing the restoration image on the basis of the patch pair selected by the selection means;
evaluation means for evaluation the patch pair selected by the selection unit, wherein
the modification parameter estimation means estimates the parameter on the basis of a result of the evaluation.

* * * * *